United States Patent Office 2,881,090
Patented Apr. 7, 1959

2,881,090

IMPREGNATION OF CARBONACEOUS MATERIALS

Ronald W. Reidl and Michael A. Bobal, Cleveland, Ohio, assignors to Union Carbide Corporation, a corporation of New York No Drawing. Application March 13, 1957
Serial No. 645,659

9 Claims. (Cl. 117—61)

This invention is concerned with thermosetting epoxy resin impregnants for carbon and graphite articles.

The conventional method of making carbon articles comprises mixing particles of solid carbonaceous material with a fluid carbonaceous binder such as pitch or tar, forming the mixture to a desired shape, and then making the shape. The baking operation drives volatile material from the mixture, and converts all of the carbonaceous materials to rigid or semi-rigid carbon, either amorphous or graphitic, depending upon the composition of the mixture, and the time and temperature of baking.

Articles produced in this manner are ordinarily porous, and are permeable to many fluids, because of the liberation of volatile materials during the baking operation.

Because of the relative inertness of carbon and graphite, heat exchangers, pipes and valves composed thereof find extensive commercial use in operations involving corrosive solvents and other highly reactive liquids. Various impregnants have been used in prior art attempts to decrease the porosity and permeability of carbonaceous stock in order to render the same impervious and chemically resistant. In general the maximum operating temperature of the impervious impregnated stock is determined by the heat stability of the resin impregnant. It is obvious, therefore, that many prior art impregnants such as furanes and phenolic resins are not suited for certain high temperature applications.

It is generally known that epoxy resins possess heat stability and resistance to chemical attack superior to phenolic and furane resins. However, commercial use of epoxy resins to render carbonaceous articles impervious has been heretofore hindered by the high viscosity of this class of material, making it difficult to incorporate the resin in the pores of the article. Even more of a hindrance has been the lack of a satisfactory curing agent for the epoxy material. The use of those amine compounds ordinarily considered by the art as satisfactory for inducing polymerization of the epoxy resin has been found to be economically impractical when used in epoxy impregnants for carbon or graphite articles because of the short "pot life" of the impregnant.

Generally in difunctional polyepoxy thermosetting resin is polymerized by the addition of a complex amine containing two or more hydrogen or hydroxyl groups. This type of amine normally acts as a curing agent for the resin, and is referred to as a hardener when it is added in stoichiometric amounts. Addition of the hardener in stoichiometric amounts permits optimum physical and chemical properties to be obtained in the resin impregnant polymer, since all the terminal oxirane rings of the resin are tied up by the amine. When more than the stoichiometric amount of amine is added, the excess behaves as a plasticizer, and is evolved at its boiling point. When an amount lesser than the stoichiometric amount of amine is used, some of the oxirane rings of the resin remain unreacted, or react with secondary hydroxyl groups formed by the initial reaction of the amine and the resin. The resin polymerization reaction proceeds without the formation of by-products. Depending upon the type of hardener employed, this reaction may proceed at room temperature, or require higher temperatures to initiate polymerization.

The epoxy resin may also be polymerized by the addition of small amounts of tertiary amines containing no functional hydrogen or hydroxyl groups. Because primary and secondary amines react very rapidly with epoxy reins to form tertiary amines, there are instances where very small amounts of primary and secondary amines will behave substantially as tertiary amines, and may, therefore, act as catalysts for the epoxy resin. The period of time necessary to polymerize the epoxy catalyst system is dependent on the temperature of cure and the concentration of the catalyst present. Because of the high viscosity of the epoxy resin, a diluent must be added to lower the viscosity of the impregnant composition to such an extent that it can be handled with a minimum of effort. In addition, a curing agent in the form of either a hardener or a catalyst or a combination of the two must be used to promote polymerization of the epoxy resin and diluent in a reasonable length of time even at elevated curing temperatures.

For the purposes of this disclosure, the hardener may be defined as a curing agent which reacts as a copolymerizing agent in the epoxy resin polymerization. A catalyst by definition is a curing agent which by its presence, accelerates the action, but does not react in the polymerization. "Pot life" is the interval of time at a specified temperature between addition of curing agent and polymerization to the solid state. The actual working life of an impregnant is always less than that shown by the "pot life" data. In order that an impregnant for baked carbon articles be economically feasible, capable of imparting to such articles the degree of imperviousness required by present chemical process requirements, and in order that the same be readily adapted to economic factory processing, this impregnant should fulfill the following requirements:

(1) Its pot life at room temperature should be long enough to allow re-use of the resin indefinitely.

(2) Its viscosity should be low enough at room temperature to allow complete penetration into the pores of the article.

(3) Its curing time to the solid stage should be sufficiently short for practical factory use.

(4) Its final curing temperature should be as low as possible.

The main object of the invention accordingly is to provide an epoxy type resin impregnant composition which will fulfill the above indicated requirements.

A further object of the invention is to provide carbon articles containing a cured impregnant, and which maintain a high degree of imperviousness at elevated temperatures, and which are resistant to chemical attack.

A further object of the invention is to provide a novel combination of curing agents for epoxy type resins.

A still further object of the invention is to provide an epoxy resin impregnant composition capable of periodic revitalizing to provide a practicaly unlimited working life.

The invention by means of which the above objects are obtained comprises the addition of a new combination of curing agents to an epoxy resin-diluent composition. This novel combination consists of dicyandiamide dissolved in dimethylformamide. In the practice of the invention, dimethylformamide acts as a catalyst, and dicyandiamide acts as a hardener to promote resin impregnant polymerization.

The steps of the present method comprise impregnating a porous carbon article with a mixture of a thermosetting epoxy resin, 8 to 15 parts by weight of a diluent per hundred of the resin parts, and from 3 to 6 parts by weight per 100 parts of resin, of a saturated solution of dicyandiamide in dimethylformamide, and thereafter resinifying the impregnants in situ with the aid of heat, or preferably with heat and pressure.

The curing agent solution preferably consists of six parts by weight of dicyandiamide dissolved at room temperature in 100 parts of dimethylformamide. It should be understood that a more dilute solution can be used, but so doing would require a greater solution volume to achieve equivalent effects, and thereby would tend to impair the original thermal and chemical resistant properties of the resin. The concentration value given represents the room temperature solubility limit of the components.

The epoxy resins used in the practice of this invention are disclosed and claimed in U. S. Patent No. 2,506,486 of H. L. Bender et al., which was issued May 2, 1950. These resins comprise a diphenol of the general formula

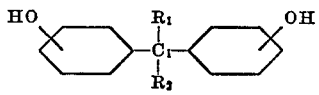

and a diglycidyl ether of a diphenol of the general formula

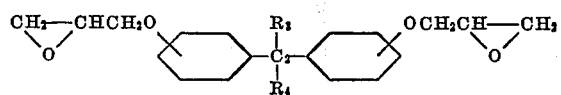

in which $R_1$ and $R_2$, when taken collectively with the connector carbon atom $C_1$, and $R_3$ and $R_4$, when taken collectively with the connector carbon atom $C_2$, are from the group consisting of cyclohexyl and alkyl-substituted cyclohexyl, and when taken separately, are from the group consisting of hydrogen, alkyl, cyclohexyl, phenyl and alkyl-substituted cyclohexyl and phenyl groups with the total number of carbon atoms in the group or groups attached to each of the connector carbon atoms not exceeding twelve, and the number of carbon atoms in any of the alkyl groups not exceeding six, the diphenol and said diglycidyl ether being present in the composition in amounts corresponding to a ratio of about 0.2 to 1.0 mol of diphenol per mol of diglycidyl ether.

Suitable diluents include n-butyl glycidyl ether, furfuryl alcohol and furan-ketone condensation products such as mixtures of partially hydrogenated mono- and difurfuryl ketones. In general, any organic compound having functional groups which react with the oxirane groups of the epoxy resin is suitable as a diluent for the purposes of the invention. Diluents have been used in concentrations ranging from 8 to 15 parts per 100 parts epoxy resin, depending upon the fluidity of the impregnant required to allow complete penetration of the pores of the carbon or graphite article. Obviously even lower amounts of diluent are suitable when penetration of the pores can be accomplished with a high viscosity impregnant.

As a means of comparing the "pot life" of epoxy resin type impregnant compositions containing conventional amino compounds as curing agents, such as suggested by H. L. Bender in U. S. 2,506,486, a series of impregnant compositions were allowed to stand in small glass beakers at room temperature (approximately 25° C.) until solidification occurred. The various compositions and the relative pot life in days for each are shown in Table I below.

TABLE I

*Pot life of epoxy impregnant compositions*

| Diluent | Curing Agent Additions | Pot Life at Room Temperature, Days |
|---|---|---|
| 10 p.p.h. Furfuryl Alcohol | 4 p.p.h. TEA | 17 |
| 10 p.p.h. Furfuryl Alcohol | 5 p.p.h. TEA | 7 |
| 8 p.p.h. Furfuryl Alcohol | 1.0 p.p.h. TEA+.5 p.p.h. TETA. | 8 |
| 8 p.p.h. Furfuryl Alcohol | 1.0 p.p.h. TEA+1.0 p.p.h. TETA. | 7 |
| 8 p.p.h. Furfuryl Alcohol | 1.0 p.p.h. TEA+2.0 p.p.h. TETA. | 7 |
| 8 p.p.h. Furfuryl Alcohol | 1.0 p.p.h. TEA+3.0 p.p.h. TETA. | 2 |
| 8 p.p.h. Furfuryl Alcohol | 1.75 p.p.h. TEA+.5 p.p.h. TETA. | 8 |
| 8 p.p.h. Furfuryl Alcohol | 2.00 p.p.h. TEA+.5 p.p.h. TETA. | 7 |
| 8 p.p.h. Furfuryl Alcohol | 1.5 p.p.h. TEA+.25 p.p.h. TETA. | 9 |
| 8 p.p.h. Furfuryl Alcohol | 1.75 p.p.h. TEA+.25 p.p.h. TETA. | 8 |
| 8 p.p.h. Furfuryl Alcohol | 2.00 p.p.h. TEA+.25 p.p.h. TETA. | 8 |
| 10 p.p.h. n-BGE | 0.6 p.p.h. DMAPA | 15 |
| 10 p.p.h. n-BGE | 0.8 p.p.h. DMAPA | 15 |
| 10 p.p.h. n-BGE | 0.95 p.p.h. aMBDA | 15 |
| 10 p.p.h. n-BGE | 1.0 p.p.h. aMBDA | 15 |
| 10 p.p.h. n-BGE | 1.1 p.p.h. aMBDA | 15 |
| 15 p.p.h. n-BGE | 1.0 p.p.h. aMBDA | 15 |
| 15 p.p.h. n-BGE | 1.1 p.p.h. aMBDA | 15 |

Legend:
TEA—triethanolamine.
TETA—triethylene tetramine.
DMAPA—dimethylaminopropylamine.
aMBDA—alpha-methylbenzyl dimethylamine.
n-BGE—normal butyl glycidyl ether.

Test tube quantities of the above compositions could be cured to the solid stage after heating for 16 to 24 hours at 90° C., 3 hours at 150° C. or an additional 3 hours at 175° C.

TABLE II

*Pot life of epoxy resin impregnant compositions*

| Composition No. | Amount [1] and Kind of Resin Diluent Added | Amount [1] and Kind of Curing Agent Added | Viscosity at 27° C. (cps.) Initial | Viscosity at 27° C. (cps.) After Storage 30 Days at R.T. | Minimum Temperature Required to Solidify Resin Composition En mass, ° C. |
|---|---|---|---|---|---|
| 1 | 10 Furfuryl Alcohol | 0.4 Dicy | 1,650 | [2] 1,800 | 250 |
| 2 | do | 0.2 Dicy | 1,600 | [2] 1,800 | 250 |
| 3 | do | 0.1 Dicy | 1,650 | [2] 1,700 | 250 |
| 4 | do | 10 DMF | 300 | 750 | 150 |
| 5 | do | 5 DMF | 570 | 1,300 | 150 |
| 6 | do | 3 DMF | 840 | 1,600 | 150 |
| 7 | do | 3(Dicy-DMF) solution 0.17 Dicy-2.83 DMF. | 1,100 | 2,000 | 110 |
| 8 | do | 5(Dicy-DMF) solution 0.28 Dicy-4.72 DMF. | 1,000 | 1,800 | 110 |

Legend:
[1] Parts by weight/100 parts epoxy resin.
[2] Dicy precipitated out of solution after storage at R.T. for 30 days.
Dicy = dicyandiamide.
DMF = dimethylformamide.
(Dicy-DMF) = saturated solution of 6 parts Dicy in 100 parts DMF.

Although all these compositions could be cured at elevated temperatures to a solid state in a period sufficiently short for factory processing, the maximum "pot life" was only 17 days. It will be understood, of course, that the useful working life of such resins would have been much shorter than this "pot life" value.

Another series of room temperature storage tests conducted in a similar manner with epoxy resin impregnants containing dicyandiamide and dimethylformamide separately preceded the discovery that a marked reduction in temperature required for solidification was effected when a combination of the two curing agents was used.

While each of the two curing agents Dicy or DMF when used separately, or in combination, allowed a satisfactorily long pot life, as indicated by viscosity changes over a 30 day storage period, only the combination Dicy-DMF composition was found to be curable in the pores of carbonaceous articles with a conveniently attainable temperature-time processing cycle.

Similarly satisfactory pot life, and curing characteristics in the graphite pores, was obtained with epoxy resin impregnant compositions containing the above combination curing agent, but employing 10 parts/100 of n-butyl glycidly ether, or a furan-ketone condensation product as a diluent. When the n-glycidyl ether was used, an increase in the concentration of the combination curing agent, approximately 20 percent, was employed. Previous experimentation has shown that the polymerization rate of the epoxy resin at elevated temperatures is decreased when this diluent is used.

The impregnation stage of the invention may be performed in any known manner. After the carbon articles are placed in a suitable impregnating vessel, processing conditions are as follows:

Initial vacuum pressure on articles to be impregnated 5–10 mm. of mercury for 5 to 10 minutes;
Vacuum on during impregnant admittance set for 5–10 mm. mercury;
Pressurizing 1 to 2 hours period at 100 p.s.i. gauge (air pressure applied to submerged articles);
Autoclave cure after impregnation 16 to 20 hours at 135° C.–90 p.s.i. gauge (internal pressure); 4 to 5 hours at 165° C.–90 p.s.i. gauge (internal air pressure).

After the first impregnation the stock may be wiped immediately to remove excess impregnant and then autoclave cured, or it may be allowed to drain about 16 hours to remove excess resin impregnant before autoclaving. In either case, during the autoclave cure, the resin film remaining on the surface of the stock is absorbed into the pores of the stock.

Subsequent reimpregnations are sometimes needed to effect imperviousness. In such cases excess impregnant must be solvent washed with acetone from the surface of the stock approximately one hour before autoclave cure. Either the stock may be autoclave-cured immediately after impregnation and washing, or if more convenient, allowed to drain for about 16 hours without washing to remove excess impregnant, and then solvent washed one hour before curing. Failure to remove the excess resin from the surface of the stock with solvent after reimpregnation will result in a resin-varnished surface after cure. Since no surface resin is absorbed into the pores of the stock during the second cure, the degree of thoroughness of solvent washing governs the appearance of the stock after cure.

As an illustrative example of this invention, 155 pieces of 108 inch long graphite pipe having a ⅞ inch internal diameter were impregnated with the impregnant identified as composition 8 in the foregoing Table II. An average weight gain of 14.7 percent of the resin was observed after the first impregnation and cure, and an average of 0.69 percent resin pick-up after the second processing.

Graphite articles other than pipe, such as rods, bars and blocks have also been epoxy resin impregnated in accordance with the above-described procedure. Modulus of rupture tests on ½ inch x ½ inch x 4 inches graphite bars so impregnated and cured were run in comparison with unimpregnated samples, and with samples impregnated with a phenolic resin such as is conventionally used in the commercial manufacture of impervious graphite products.

Table III summarizes the strength characteristics of phenolic and epoxy-impregnated graphite. The phenolic and epoxy impregnated graphite exhibited a 63 percent and 106 percent increase, respectively, in the strength of the graphite.

TABLE III

*Strength characteristics of impregnated graphite*

| Impregnant | Modulus of Rupture (Average 10 Pieces) | Percent Increase |
|---|---|---|
| None | 2,770 | |
| Phenolic | 4,520 | 63 |
| Epoxy | 5,710 | 106 |

Graphite pipe impregnated and cured in accordance with the invention after an eight week heat test at 200° C. exhibited retention of imperviousness superior to phenolic-impregnated graphite pipe, during heat tests at 150° C. After heat test at 250° C. the retention of imperviousness of epoxy-impregnated graphite pipe was equal to that of phenolic impregnated graphite pipe after heat test at 150° C.

Heat test results at 150° C. and 200° C. on ½ inch x ½ inch x 4 inches graphite bars containing phenolic and epoxy impregnants are summarized in Table IV below. It can be seen that the percent change in weight and the percent change in modulus of elasticity is greater for phenolic impregnated stock than for the epoxy-impregnated material.

TABLE IV

HEAT TEST RESULTS AT 200° C.

| | Percent Change in Weight | | Percent Change in Modulus of Elasticity | |
|---|---|---|---|---|
| | 4 Weeks | 8 Weeks | 4 Weeks | 8 Weeks |
| Phenolic | −3.78 | −4.79 | −26.1 | −28.3 |
| Epoxy | −0.49 | −0.74 | −1.0 | −0.8 |

HEAT TEST RESULTS AT 150° C.

| | Percent Change in Weight | | Percent Change in Modulus of Elasticity | |
|---|---|---|---|---|
| | 2 Weeks | 4 Weeks | 2 Weeks | 4 Weeks |
| Phenolic | −0.79 | −0.88 | −8.9 | −10.1 |
| Epoxy | −0.10 | −0.10 | −2.3 | −0.7 |

The percent change in weight and the percent change in modulus of elasticity for phenolic and epoxy-impregnated graphite bars after corrosion tests are given in Table V. It can be seen that the phenolic-impregnated graphite shows a greater percent change in weight and percent change in modulus of elasticity than the epoxy-impregnated graphite, showing a greater resistance to corrosive attack on the part of the epoxy-impregnated graphite.

TABLE V
Corrosion tests

| Reagent | Temperature, °C | Phenolic Percent Weight Change | | Epoxy Percent Weight Change | | Percent Change in Modulus of Elasticity | | | |
|---|---|---|---|---|---|---|---|---|---|
| | | | | | | Phenolic | | Epoxy | |
| | | 2 Weeks | 4 Weeks | 2 Weeks | 4 Weeks | 2 Weeks | 4 Weeks | 2 Weeks | 4 Weeks |
| 60% $H_2SO_4$ | B.P.—142 | —0.16 | —0.29 | 0.06 | —0.03 | —1.5 | —3.7 | —1.9 | —2.3 |
| Chlorobenzene+1% HCl | B.P.—112 | —0.00 | —0.17 | —0.06 | —0.14 | —1.7 | —3.0 | —0.9 | —1.8 |
| 5% NaOH | B.P.—101 | | | +0.03 | +0.04 | [1]—11.4 | [1]—16.6 | —2.5 | —5.4 |
| 25% NaOH | B.P.—112 | | | —0.01 | —0.02 | [1]—49.9 | [1]—67.0 | —0.6 | —2.8 |

[1] Approximate.

What is claimed is:

1. A baked carbon article which in its normal use is exposed to corrosive conditions at elevated temperatures, the pores of which are substantially filled with a resinified mixture of a thermosetting epoxy resin, an organic diluent having functional groups capable of reacting with the oxirane groups of said resin, and a solution of dicyandiamide in dimethyl formamide.

2. A baked carbon article which in its normal use is exposed to corrosive conditions at elevated temperatures, the pores of which are substantially filled with a resinified mixture of a thermosetting epoxy resin, an organic diluent selected from the group consisting of n-butyl glycidyl ether, furfuryl alcohol, furan-ketone condensation products and mixtures thereof, and a saturated solution of dicyandiamide in dimethyl formamide.

3. A baked carbon article which in its normal use is exposed to corrosive conditions at elevated temperatures, the pores of which are substantially filled with a resinified mixture of an epoxy resin, from 8 to 15 parts by weight per 100 parts of resin of a diluent selected from the group consisting of n-butyl glycidyl ether, furfuryl alcohol, furan-ketone condensation products and mixtures thereof, and from 3 to 6 parts by weight per 100 parts of resin of a saturated solution of dicyandiamide in dimethyl formamide.

4. A process for making an impervious article, which process comprises impregnating a porous carbon article with a mixture of a thermosetting epoxy resin, a diluent having functional groups capable of reacting with the oxirane groups of said resin, and a solution of dicyandiamide in dimethyl formamide, and resinifying said mixture in situ.

5. A process for making an impervious article, which process comprises impregnating a porous carbon article with a mixture of a thermosetting epoxy resin, a diluent selected from the group consisting of n-butyl glycidyl ether, furfuryl alcohol, furan-ketone condensation products, and mixtures thereof, and a solution of dicyandiamide in dimethyl formamide, and resinifying said mixture in situ at a temperature of 135° C. to 165° C. at super-atmospheric pressure.

6. A process for making an impervious carbon article, which process comprising placing a porous carbon article in a vacuum, placing in contact with said carbon article a mixture of a thermosetting epoxy resin, 8 to 15 parts per 100 parts of resin of a diluent selected from the group consisting of n-butyl glycidyl ether, furfuryl alcohol, furan-ketone condensation products, and mixtures thereof, and from 3 to 6 parts per 100 parts of resin of a saturated solution of dicyandiamide in dimethyl formamide, releasing said vacuum to force said mixture into the pores of said carbon article, and then resinifying said mixture in situ.

7. As a new composition of matter, a material intended for use as an impregnant for carbonaceous articles, said material consisting of a thermosetting epoxy resin, an organic diluent having functional groups capable of reacting with the oxirane groups of said resin and a solution of dicyandiamide in dimethyl formamide.

8. As a new composition of matter, a material intended for use as an impregnant for carbonaceous articles, said material consisting of a thermosetting epoxy resin, an organic diluent selected from the group consisting of n-butyl glycidyl ether, furfuryl alcohol and furan-ketone condensation products and mixtures thereof, and a saturated solution of dicyandiamide in dimethyl formamide.

9. As a new composition of matter, a material intended for use as an impregnant for carbonaceous articles, said material consisting of a thermosetting epoxy resin, from 8 to 15 parts by weight per one hundred parts of resin of an organic diluent selected from the group consisting of n-butyl glycidyl ether, furfuryl alcohol, furan-ketone condensation products and mixtures thereof, and from 3 to 6 parts by weight per one hundred parts of resin of a saturated solution of dicyandiamide in dimethyl formamide.

References Cited in the file of this patent
UNITED STATES PATENTS

| | | |
|---|---|---|
| 2,224,724 | Elsey | Dec. 10, 1940 |
| 2,520,651 | Oswald | Aug. 29, 1950 |
| 2,768,992 | Zukas | Oct. 30, 1956 |
| 2,786,794 | Gams et al. | Mar. 26, 1957 |